United States Patent
Pawar et al.

(10) Patent No.: US 10,652,364 B2
(45) Date of Patent: May 12, 2020

(54) SHARED DISPLAY LINKS IN A USER SYSTEM

(71) Applicant: Intel Corporation, Santa Clara, CA (US)

(72) Inventors: Sagar C. Pawar, Bangalore (IN); Ravindra A. Babu, Bangalore (IN); Satyanantha R. Musunuri, Bangalore (IN); Sashank Ms, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 15/393,159

(22) Filed: Dec. 28, 2016

(65) Prior Publication Data

US 2018/0183898 A1    Jun. 28, 2018

(51) Int. Cl.
*H04L 29/06* (2006.01)
*H04L 29/08* (2006.01)

(52) U.S. Cl.
CPC .............. *H04L 67/38* (2013.01); *H04L 67/14* (2013.01); *H04L 67/42* (2013.01)

(58) Field of Classification Search
CPC ......... H04L 67/14; H04L 67/38; H04L 67/42; H04L 29/06034
USPC ........................................................ 709/219
See application file for complete search history.

(56) References Cited

U.S. PATENT DOCUMENTS

| 8,764,532 B1 | 7/2014 | Berme | |
|---|---|---|---|
| 2014/0053090 A1* | 2/2014 | Lu | G06F 3/017 715/761 |
| 2015/0346489 A1 | 12/2015 | Lindley et al. | |
| 2016/0026253 A1 | 1/2016 | Bradski et al. | |
| 2016/0030835 A1* | 2/2016 | Argiro | A63F 13/02 463/33 |

(Continued)

FOREIGN PATENT DOCUMENTS

WO    WO-2008057864 A2 *    5/2008    ............. A63F 13/06

OTHER PUBLICATIONS

TC358870XBG HDMI® Interface Bridge (2016) retrieved from URL <<http://toshiba.semicon-storage.com/ap-en/product/assp/interface-bridge/detail.TC358870XBG.html>> [retrieved on Dec. 28, 2016], 22 pages.

(Continued)

*Primary Examiner* — Davoud A Zand
*Assistant Examiner* — Adam A Cooney
(74) *Attorney, Agent, or Firm* — Schwabe, Williamson & Wyatt, P.C.

(57) ABSTRACT

Embodiments include apparatuses, methods, and systems including a communication aggregator having a first interface to communicate with a host through a first link based on a first protocol, a second interface coupled to the first interface to communicate with a display device through a second link based on the first protocol, and a third interface coupled to the first interface to communicate with a sensor through a third link coupled to the third interface based on a second protocol. Moreover, the host is to communicate with the display device through the first link based on the first protocol, and the second link based on the first protocol; and the sensor is to communicate with the host through the third link based on the second protocol, and the first link based on the first protocol. Other embodiments may also be described and claimed.

25 Claims, 8 Drawing Sheets

(56) References Cited

U.S. PATENT DOCUMENTS

| | | | |
|---|---|---|---|
| 2016/0163110 A1 | 6/2016 | Chang et al. | |
| 2016/0163283 A1* | 6/2016 | Chang | G06T 7/73 |
| | | | 345/633 |
| 2016/0187969 A1* | 6/2016 | Larsen | G06F 3/012 |
| | | | 345/156 |
| 2016/0188506 A1* | 6/2016 | Wang | G06F 13/287 |
| | | | 710/106 |
| 2016/0202944 A1 | 7/2016 | Dent | |

OTHER PUBLICATIONS

Kaufmann, H., Csisinko M. (2006) Multiple Head Mounted Displays in Virtual and Augmented Reality Applications, International Journal of Virtual Reality, 2006, 5(3):1-10, 8 pages.

Infante, A. (2015) Can Virtual Reality Cut the Cord?<<http://www.makeuseof.com/tag/can-virtual-reality-cut-cord/>> [retrieved on Dec. 28, 2016], 20 pages.

International Search Report and Written Opinion dated Mar. 8, 2018, issued in related International Application No. PCT/US2017/061628, 17 pages.

\* cited by examiner

SHARED DISPLAY LINKS IN A USER SYSTEM

FIELD

Embodiments of the present invention relate generally to the technical field of communication, and more particularly to shared display links in a virtual reality system.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Two communication devices may communicate through a communication link between them based on a communication protocol. A communication device may be referred to as a device, a communication link as a link, and a communication protocol as a protocol. A link between two devices may be an actual physical link, such as a wired cable, or a wireless link. A link may include one or more channels, where a channel may be a logical path between two devices over a link. A protocol may be a set of rules that allow two devices to communicate information on a link between them.

Multiple devices communicating with one another through multiple links may form a communication system for various applications. For example, a virtual reality (VR) system may include various devices, e.g., a host computer (or simply referred to as a host), display devices, projectors, various sensors, and/or input devices, communicating through multiple links to generate realistic images, sounds, and other sensations that replicate a real environment. However, multiple links, e.g., wired cables, connecting the various devices may restrict user movements and create an uncomfortable user experience for users of the VR system. Similarly, multiple links may create undesirable user experiences for other communication systems and applications as well, such as gaming systems, or others.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
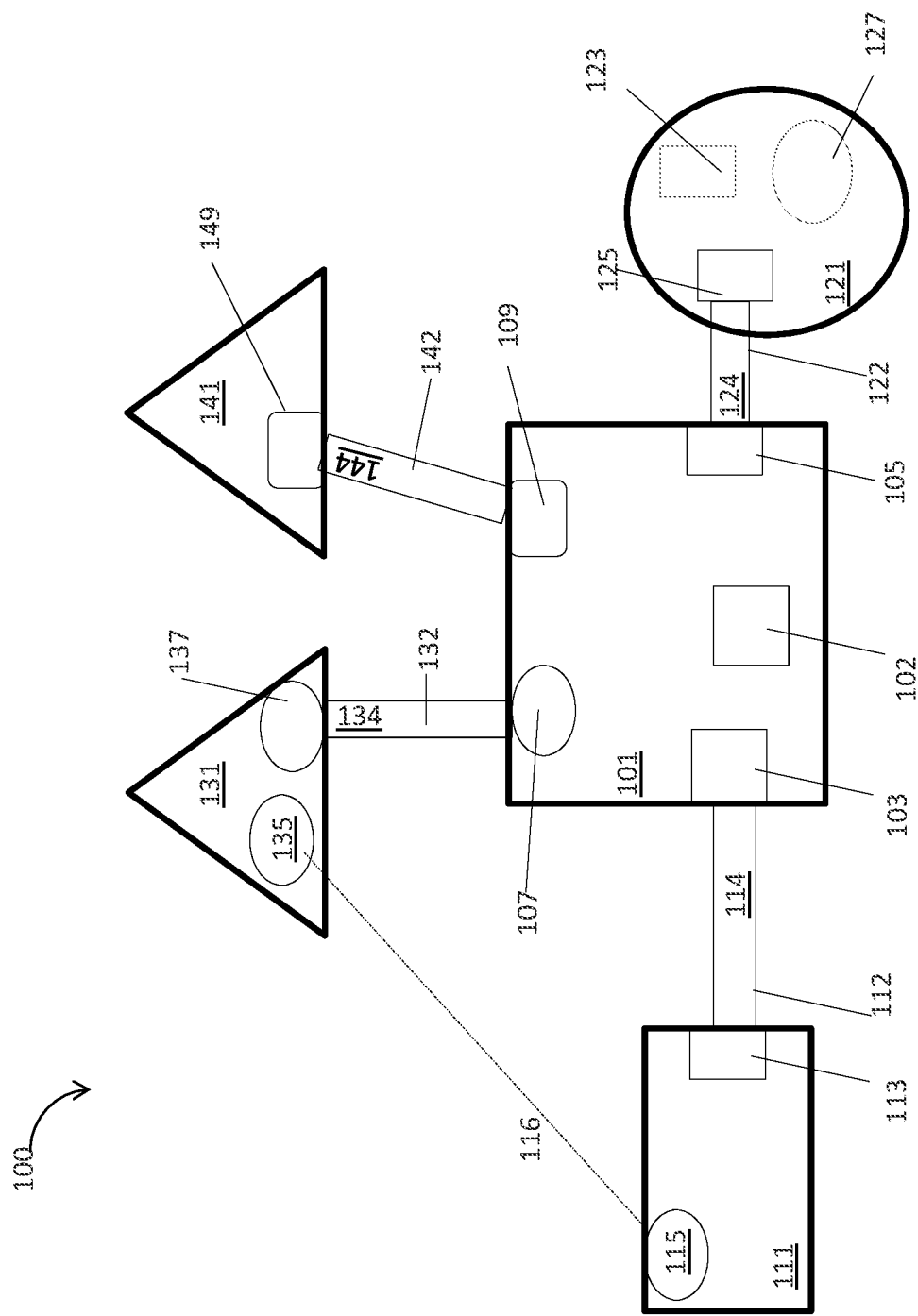
FIG. 1 illustrates an example virtual reality system including multiple devices communicating with a host by way of an aggregator through a shared link between the host and the aggregator based on a protocol, in accordance with various embodiments.

Virtual reality (VR) typically refers to technologies that use software to generate realistic images, sounds and other sensations that replicate a real environment, and/or simulate a character or a user's physical presence in the replicated environment. A VR system may be a communication system to create VR for a user. In more detail, a VR system may include a host or hosts coupled to various sensors, input devices, and one or more display devices by multiple links, e.g., wired cables. The host may store multimedia data, and transfer the data to the display device to provide virtual reality displays on the display device. The communication between the host and the display device may be based a display protocol designed for communication with the display device. The information transferred to the display device may be in a format that is designed for display information. Additionally, various sensors and input devices may be coupled to the host to provide sensor information or inputs on the user's movements, actions, and feedbacks. The host may adjust the information to be transferred to the display device for the user based on the sensor information or inputs. Besides creating virtual reality, a VR system including hosts, display devices, sensors, and input devices may be useful for other applications, e.g., gaming systems, or others. A VR system herein may refer to such a communication system that includes a host or hosts, display devices, various sensors and input devices, or others.

In a VR system, a host may communicate with multiple devices through multiple links, e.g., wired cables, where the multiple links may create undesirable user experiences or other undesirable impact. To reduce undesirable impacts and improve user experiences, e.g., to improve the mobility of the user, a communication aggregator, or simply referred to as an aggregator, may be placed in a VR system, so that there is a reduced number of links, e.g., only one link, between the aggregator and the host. Hence, the user's mobility may be improved with the reduced number of wired cables between the multiple devices and the host. The display device and the various sensors may communicate to the host by way of the aggregator through the shared link or links between the aggregator and the host. Information from a sensor or other devices received in formats based on other protocols may be converted into a format based on a protocol for the shared link or links to be communicated with the host. For ease of understanding, the remaining description will primarily be presented in the context of a single shared link, however, the disclosure is not so limited, and may be practiced with multiple shared links.

In embodiments, an aggregator may be an apparatus for communication in a VR system, and may include a controller coupled to multiple interfaces, e.g. a first interface, a second interface, and a third interface. The aggregator may communicate with a host through a first link coupled to the first interface, communicate with a display device through a second link coupled to the second interface, and communicate with a sensor through a third link coupled to the third interface. Moreover, the communication through the first link and the communication through the second link may be based on a same protocol, e.g., a first protocol, which may be a display protocol designed for communication with the display device to provide virtual reality displays on the display device. On the other hand, the communication through the third link may be based on a second protocol to provide sensor information for the virtual reality displays. Consequently, the host may communicate with the display device through the first link and the second link based on the first protocol (e.g., the display protocol). Similarly, the host may communicate with the sensor through the first link based on the first protocol, and the third link based on the second protocol (e.g., a non-display protocol). Information from the senor, in a format based on the second protocol, may be converted to another format based on the first protocol, and further communicated with the host. Similarly, information from the host, in a format based on the first protocol, may be converted to another format based on the second protocol, and further communicated with the sensor. The communication between the sensor and the host, and the conversion of the information from one format to another may be facilitated by the controller within the aggregator.

In embodiments, a system for virtual reality may include an aggregator, a host, a display device, and a sensor, all coupled with the aggregator. The host is to communicate with the aggregator through a first link based on a first protocol, the display device is to communicate with the aggregator through a second link based on the first protocol, and the sensor is to communicate with the aggregator through a third link based on a second protocol. Consequently, the host is to communicate with the display device to provide virtual reality displays through the first link based on the first protocol, and the second link based on the first protocol. Similarly, the sensor is to communicate with the host to provide sensor information for the virtual reality displays through the third link based on the second protocol, and the first link based on the first protocol.

In embodiments, a virtual reality apparatus may be coupled to a host by a first link, to a display device by a second link, and to a sensor by a third link. A method performed by the virtual reality apparatus may include: receiving a first information associated with providing virtual reality displays, in a first format based on a first protocol from the host through the first link; and transmitting the first information to the display device to present the virtual reality displays through the second link coupled to the display device. The method may further include obtaining a second information from the sensor for the virtual reality displays through the third link coupled to the sensor, where the second information is in a second format based on a second protocol. In addition, the method may include converting the second information in the second format to the second information in the first format based on the first protocol, and transmitting the second information in the first format through the first link to the host based on the first protocol.

Embodiments herein may be applied to many applications where a host may be coupled to multiple devices to reduce the number of links to the device. For ease of understanding, the remaining description may frequently refer to a VR system. Those skilled in the art would appreciate that the VR system may be for illustrations only and may not be limiting, and the present disclosure may be applied to many other communication systems.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example VR system 100 including multiple devices, e.g., a display device 121, a sensor 131, and an input device 141, communicating with a host, e.g., a host 111, by way of an aggregator, e.g., an aggregator 101, through a shared link, e.g., a link 112 between the host 111 and the aggregator 101, based on a protocol 114, in accordance with various embodiments.

In embodiments, the aggregator 101 may communicate with the host 111 through the link 112 based on the protocol 114, communicate with the display device 121 through a link 122 based on a protocol 124, communicate with the sensor 131 through a link 132 based on a protocol 134, and communicate with the input device 141 through a link 142 based on a protocol 144. The aggregator 101 may convert information from the sensor 131, or the input device 141, in formats based on the protocol 134, or the protocol 144, into a format based on the protocol 114, and further communicate such information to the host 111. Similarly, the aggregator 101 may convert information from the host 111 in a format based on the protocol 114 to formats based on the protocol 134 or the protocol 144 and communicate such information to the sensor 131, or the input device 141. In some embodiments, the protocol 124 may be the same as the protocol 114, and the aggregator 101 may simply pass information in a same format based on the protocol 114 and the protocol 124 between the host 111 and the display device 121.

In embodiments, the aggregator 101 may include an interface 103, an interface 105, an interface 107, and an interface 109, coupled with each other. An interface, e.g., the interface 103, the interface 105, the interface 107, or the interface 109, may include a network interface card, a transceiver, a modem, or so forth. Hence, in embodiments, an interface may be referred to as a transceiver, or a modem. Similarly, the host 111 may include an interface 113 and an interface 115, the display device 121 may include an interface 125, the sensor 131 may include an interface 135 and an interface 137, and the input device 141 may include an interface 149. The interface 113, the interface 115, the interface 125, the interface 135, the interface 137, and the interface 149 may include a network interface card, a transceiver, a modem, or so forth.

In embodiments, the link 112 may be between the interface 103 and the interface 113. The link 122 may be between the interface 105 and the interface 125. The link 132 may be between the interface 107 and the interface 137. The link 142 may be between the interface 109 and the interface 149. In some embodiments, there may be a link 116 between the interface 115 and the interface 135 for the host 111 to communicate with the sensor 131 without going through the aggregator 101. Such an addition link, e.g., the link 116, may be used for some applications where certain direct communication between the host 111 and the sensor 131 may be desired.

In embodiments, a link, e.g., the link 112, the link 122, the link 132, the link 142, or the link 116 may be an actual physical link. The link may be a wired cable, or a wireless link. For example, the link 112 may be a wired cable, while the link 132 may be a wireless link. Different links may use a same or different communication technology. For example, the link 132 may use a wireless cellular technology, the link 142 may use a different wireless technology, such as Bluetooth®, while the link 122 may be a wired cable. In some other embodiments, the link 112, the link 122, the link 132, the link 142, and the link 116 may all be wired cables.

In embodiments, the protocol 114 for the link 112, the protocol 124 for the link 122, the protocol 134 for the link 132, or the protocol 144 for the link 142 may be some communication or computing protocols. The protocol 114, the protocol 124, the protocol 134, or the protocol 144 may include a protocol stack containing protocols in various layers, e.g., protocols for a physical layer, a medium access layer, a network layer, or an application layer. In embodiments, the protocol 114 may be a display protocol designed for communication between the host 111 and the display device 121 to provide virtual reality displays on the display device 121. In embodiments, the protocol 134 for the sensor 131 to communicate with the aggregator 101 may provide sensor information for the virtual reality displays to be displayed on the display device 121.

In embodiments, the protocol 114 and the protocol 124 may be a display protocol, such as a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol. Whereas the protocol 134 and the protocol 144 may be a non-display general purpose communication bus protocol, such as a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

In some other embodiments, the protocol 134, or the protocol 144 may include a wireless protocol. For example, the protocol 134, or the protocol 144 may include a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, or others.

In embodiments, the aggregator 101 may include a controller 102 to facilitate information communicated among the multiple devices through the links. Information communicated among the devices may include data, voice, or multimedia. The controller 102 may facilitate to convert information from a first device in a first format based on a first protocol into a second format based on a second protocol to be transferred to a second device. For example, the controller 102 may facilitate to convert information from the sensor 131 or the input device 141, in a format based on the protocol 134 or the protocol 144, into a format based on the protocol 114 to be further transferred to the host 111. Similarly, the controller 102 may facilitate to convert information from the host 111 in a format based on the protocol 114 into formats based on the protocol 134 or the protocol 144 to be further transferred to the sensor 131 or the input device 141. In addition, the controller 102 may facilitate to convert information from the sensor 131 in a format based on the protocol 134 into a format based on the protocol 124 to be further transferred to the display device 121. Furthermore, some of the protocols may be the same. For example, the protocol 124 may be the same as the protocol 114, and the controller 102 may simply facilitate the aggregator 101 to pass information in a same format based on the protocol 114 and the protocol 124 between the host 111 and the display device 121. More details of the operations performed by the controller 102 may be illustrated in FIG. 5 and FIG. 6.

In embodiments, the host 111 may be a computer or a computing device that offers information resources, services, and applications to other devices of the system 100, e.g., the display device 121. The host 111 and the display device 121 may communicate through the aggregator 101 using a client-server model of computing, where the host 111 may be a server. In some other embodiments, the host 111 and the display device 121 may communicate through the aggregator 101 using peer-to-peer model, when the host 111 and the display device 121 share and consume resources in an equipotent manner. In embodiments, the host 111 may be a master device communicating through the aggregator 101 with the display device 121, where the display device 121 may be a slave device, and the host 111 may have unidirectional control over the display device 121.

In embodiments, when the VR system 100 may create VR for a user, the host 111 may deliver a simulation and its configuration to one or more visual clients, e.g., the display device 121. The host 111 may receive feedbacks from other devices, e.g., the sensor 131 and the input device 141, and adjust the delivery of virtual reality content to the display device 121 based on the feedbacks received.

In embodiments, the display device 121 may include a display 127 and a controller 123. For example, the display 127 may be a selected one of a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper. In embodiments, the display 127 may be mounted on a headset attached to a user. The controller 123 may facilitate the information received from the host 111 through the aggregator 101 to be displayed on the display 127.

In embodiments, the sensor 131 may be a selected one of a magnetometer, an accelerometer, a gyroscope, a pressure sensor, a humidity sensor, a proximity sensor, a position sensor, or a temperature sensor. In addition, the input device 141 may be a keyboard, a cursor control device, a button, or some other input devices. In some embodiments, the sensor 131 or the input device 141 may be substituted by some other devices, e.g., a wearable device, depending on the application the VR system 100 is designed for.

In embodiments, the host 111 may be a wearable device, a smartphone, a computer tablet, a laptop, a game controller, a set-top box, an infotainment console, an Internet of Things (IoT) device, or others.

Figure 2:
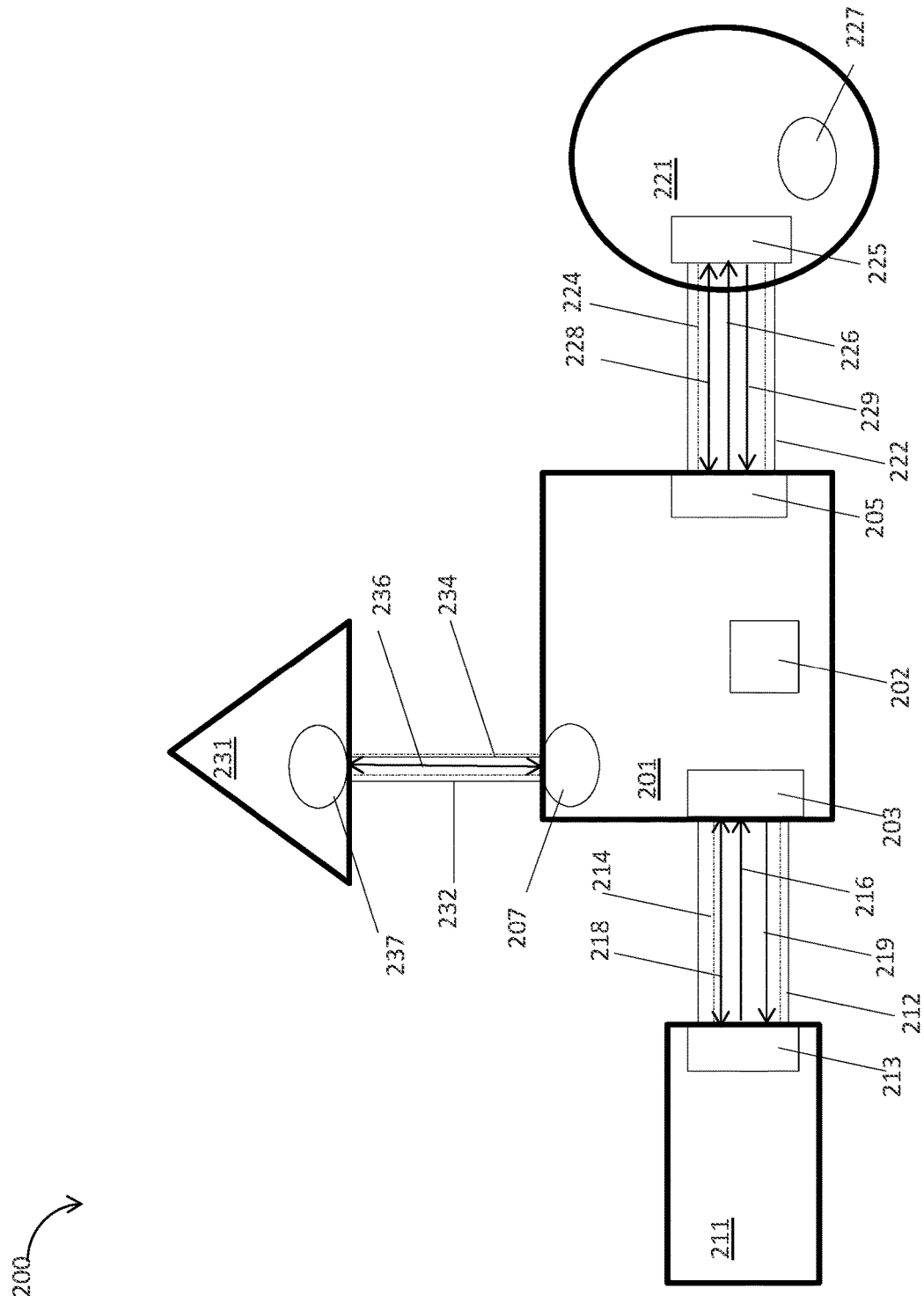
FIG. 2 illustrates another example virtual reality system including multiple devices communicating with a host by way of an aggregator through a shared link between the host and the aggregator based on a protocol, in accordance with various embodiments.

FIG. 2 illustrates another example VR system 200 including multiple devices, e.g., a display device 221, and a sensor 231 communicating with a host, e.g., a host 211, by way of an aggregator, e.g., an aggregator 201, through a shared link, e.g., a link 212 between the host 211 and the aggregator 201, based on a protocol 214, in accordance with various embodiments. The system 200 may be an example of the system 100 shown in FIG. 1. For example, the aggregator 201 may be an example of the aggregator 101, the host 211, the display device 221, and the sensor 231 may be an example of the host 111, the display device 121, and the sensor 131, respectively. The VR system 200 may further include other devices, e.g., an input device, not shown for clarity.

In embodiments, the aggregator 201 may communicate with the host 211 through the link 212 based on the protocol 214, communicate with the display device 221 through a link 222 based on a protocol 224, and communicate with the sensor 231 through a link 232 based on a protocol 234. The aggregator 201 may convert information from the sensor 231 in a format based on the protocol 234 into a format based on the protocol 214, and further communicate such information to the host 211. Similarly, the aggregator 201 may convert information from the host 211 in a format based on the protocol 214 to a format based on the protocol 234 and communicate such information to the sensor 231. In some embodiments, the protocol 224 may be the same as the protocol 214, and the aggregator 201 may simply pass information in a same format based on the protocol 214 and the protocol 224 between the host 211 and the display device 221. In embodiments, the information from the host 211 received by the display device 221 may be presented to a user on the display 227.

In embodiments, the aggregator 201 may include an interface 203, an interface 205, and an interface 207, coupled with each other. Similarly, the host 211 may include an interface 213, the display device 221 may include an interface 225, and the sensor 231 may include an interface 237. In embodiments, the link 212 may be between the interface 203 and the interface 213. The link 222 may be between the interface 205 and the interface 225. The link 232 may be between the interface 207 and the interface 237. In embodiments, the protocol 214 for the link 212, the protocol 224 for the link 222, or the protocol 234 for the link 232, may be some communication or computing protocols.

In embodiments, the link 212 may include more than one channel, where a channel may be a single path between two devices. For example, the link 212 may include a channel 219, a channel 216, and a channel 218. Similarly, the link 222 may include a channel 229, a channel 226, and a channel 228. On the other hand, the link 232 may include a channel 236.

In embodiments, there may be different kinds of channels in a link. For example, the channel 219 may be a simplex channel from the aggregator 201 to the host 211, the channel 216 may be another simplex channel from the host 211 to the aggregator 201, and the channel 218 may be a duplex channel between the host 211 and the aggregator 201. In embodiments, the channel 218 may be a full duplex channel or a half-duplex channel. In embodiments, the channel 219, the channel 216, or the channel 218 may be a serial channel, or plurality of parallel channels. Similarly, the channel 229 and the channel 226 may be a simplex channel, while the channel 228 may be a duplex channel. In embodiment, the link 232 may include only one channel 236, which may be a simplex channel or a duplex channel.

In embodiments, the protocol 214 for the link 212 may provide a set of rules for all or a part of the channels of the link 212. When a link has multiple channels, a protocol on the link may provide a set of rules for all channels within the link. For example, the protocol 214 may provide a set of rules for the channel 219, the channel 216, and the channel 218. Similarly, the protocol 224 may provide a set of rules for the channel 229, the channel 226, and the channel 228. In addition, the protocol 234 may provide a set of rules for the channel 236.

In embodiments, the protocol 214 and the protocol 224 may be a selected one of a MIPI-DSI protocol, a HDMI protocol, a display port (DP) protocol, a Miracast protocol, or a wireless display (WiDi) protocol. Furthermore, the protocol 234 may be a selected one of a SPI protocol, a SCI protocol, a SCSI protocol, a USB protocol, a PCI protocol, or an I$^2$C protocol.

For example, the protocol 214 may be a MIPI-DSI protocol, which is a protocol aimed at reducing the cost of display controllers in a mobile device commonly having LCD or similar display technologies. The MIPI-DSI protocol may include a serial bus and a communication protocol between a host (source of the image data) and a display device (destination of the image data). When the protocol 214 is the MIPI-DSI protocol for the link 212 between the aggregator 201 and the host 211, there may be four different channels (also called lanes in MIPI-DSI standard) within the link 212, namely, MIPI-DSI-D0, MIPI-DSI-D1, MIPI-DSI-D2, and MIPI-DSI-D3. MIPI-DSI-D0 may be a bidirectional duplex channel, while MIPI-DSI-D1, MIPI-DSI-D2, and MIPI-DSI-D3 may be unidirectional simplex channels from the host 211 to transfer multimedia data to the display device 221 by way of the aggregator 201. When more than one lane of MIPI-DSI-D0, MIPI-DSI-D1, MIPI-DSI-D2, and MIPI-DSI-D3 is used, they may transmit data in parallel from the host 211. Therefore, 4 bits may be transmitted simultaneously from the host 211 to the aggregator 201 over the link 212 based on the MIPI-DSI protocol, one on each lane.

The MIPI-DSI protocol may include a set of commands, the display command set (DCS), for controlling the display device. In addition, the MIPI-DSI protocol may include a set of commands, the manufacturer command set (MCS), which is a device-specific command space whose definition is up to the device manufacturer. Originally, the MCS commands may be intended to program non-volatile memory or set specific display device registers. In embodiments, when the protocol 214 is the MIPI-DSI protocol, the MCS commands may be extended to program other devices, e.g., the sensor 231, to send data from the host 211 to the sensor 231, or to receive data from the sensor 231.

In embodiments, the aggregator 201 may include a controller 202 to facilitate information communicated among the multiples devices through the links. The controller 202 may manage the multiple devices, and facilitate to convert information from a first device in a first format based on a first protocol into a second format based on a second protocol for different channels within a link.

To manage the multiple devices, the controller 202 may maintain a device table to list the devices coupled to the aggregator 201, such as the sensor 231, the display device 221, input devices, and others. The controller 202 may further assign a unique device identifier (ID) for each device coupled to the aggregator 201. The host 211 may also maintain a device table of devices communicating with the host 211. The device table maintained by the host 211 may be different from the device table maintained by the aggregator 201, because there may be devices directly communicating with the host 211 without going through the aggregator 201. To keep the device table maintained by the host 211 and the device table maintained by the aggregator 201 consist, the aggregator 201 may update the host 211 whenever any device is coupled to the aggregator 201, or disconnected form the aggregator 201. Besides the device tables maintained by the controller 202 or the host 211, there may be other ways to manage the multiple devices. For example, each device may be assigned a unique device ID by the host 211, and the device may include its unique device ID in any information sent from the device.

When the host 211 intends to send information to the sensor 231, the host 211 may include the unique device ID of the sensor 231 into the information to be delivered to the aggregator 201, so that the aggregator 201 may further transfer the information to the sensor 231. When the sensor 231 sends information to the aggregator 201 to be transferred to the host 211, the controller 202 may include the unique device ID of the sensor 231 into the information to be delivered to the host 211. The unique device ID may be included in a format discussed in FIGS. 3(*a*)-3(*b*).

In embodiments, the controller 202 may facilitate to convert information from the sensor 231 in a format based on the protocol 234 to a format based on the protocol 214 for a duplex channel, e.g., the channel 218 within the link 212, or to a format based on the protocol 214 for a simplex channel, e.g., the channel 219 within the link 212. Similarly, the controller 202 may facilitate to convert information from the host 211 in a format based on the protocol 214 to a format based on the protocol 234 to be transferred to the sensor 231. More details of example formats for the channel 218 based on the protocol 214 may be shown in FIGS. 3(*a*)-3(*b*).

For example, the protocol 214 may be the MIPI-DSI protocol having 4 channels, MIPI-DSI-D0, MIPI-DSI-D1, MIPI-DSI-D2, and MIPI-DSI-D3, where MIPI-DSI-D0 is a bidirectional duplex channel. When designed, MIPI-DSI-D0 is used for reading Extended Display Identification Data (EDID) information on the display device 221 when the display device 221 is initially connected. In detail, EDID information may be a data structure provided by a display, e.g., the display 227, to describe its capabilities to a video source (e.g. graphics card or set-top box). In embodiments, in addition to transfer EDID information of the display device 221 as originally designed, MIPI-DSI-D0 may be extended to transfer information from the sensor 231 received by the aggregator 201 to the host 211. The controller 202 may facilitate to convert information from the sensor 231 in a format based on the protocol 234 to a format for MIPI-DSI-D0 in the MIPI-DSI protocol, to include the unique ID of the sensor 231 in the information transferred to the host 211.

Figure 3:
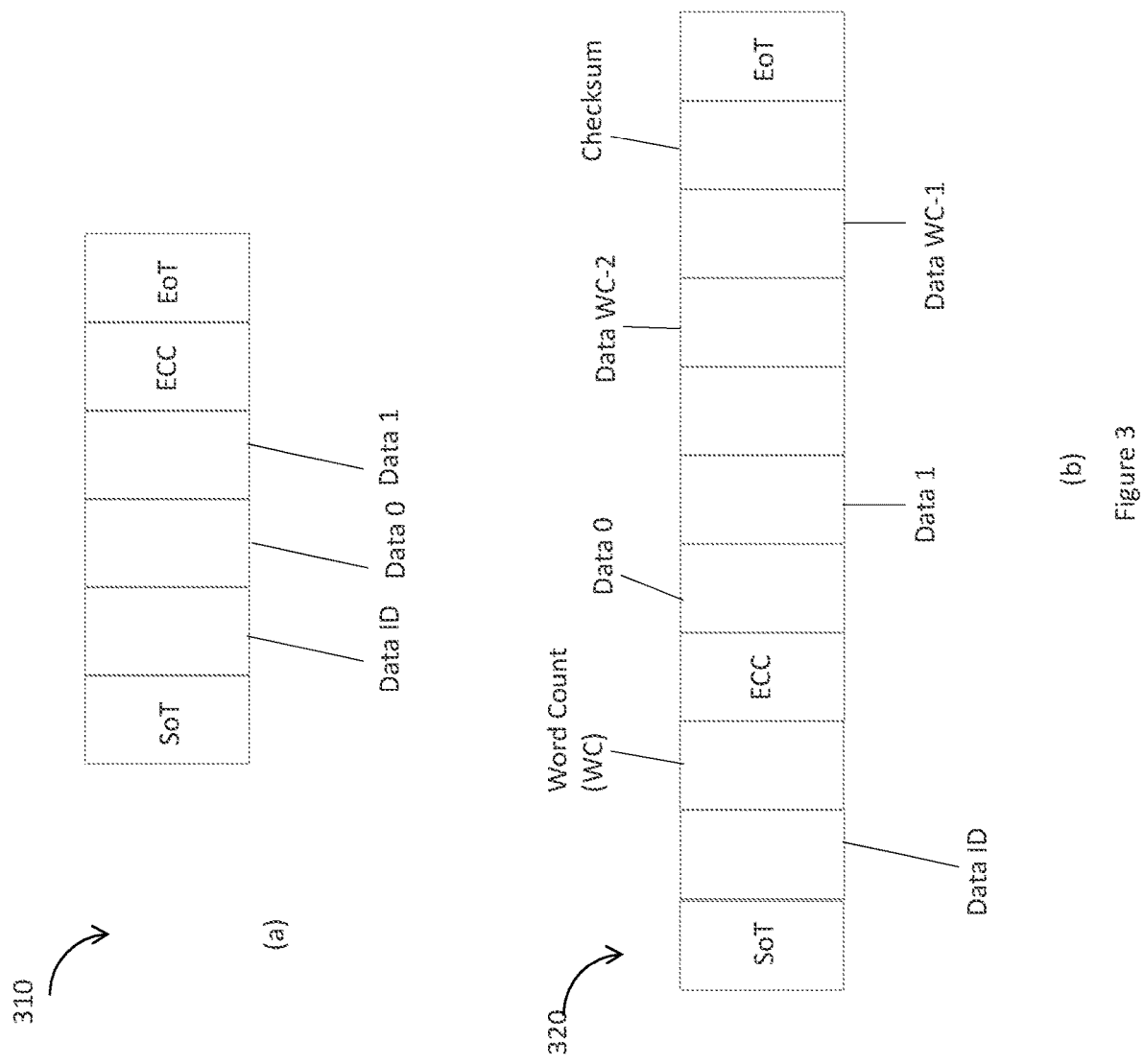
FIGS. 3(a)-3(b) illustrate example protocol formats for a shared link between a host and an aggregator in a virtual reality system, in accordance with various embodiments.

FIGS. 3(*a*)-3(*b*) illustrate example protocol formats, a format 310 and a format 320, for a shared link between a device and an aggregator in a virtual reality system, in accordance with various embodiments. The format 310 and the format 320 may be different formats for the protocol 114 for the link 112 between the aggregator 101 and the host 111, as shown in FIG. 1. The format 310 and the format 320 may be different formats of the protocol 214 for a channel of the link 212 between the aggregator 201 and the host 211, as shown in FIG. 2. The format 310 and the format 320 may be for one layer, e.g., a network layer, of the protocol 114 or the protocol 214. There may be different rules and formats for other layers, such as physical layer, lane management layer, or application layer, for the protocol 114, or the protocol 214.

As shown in FIG. 3(*a*), in embodiments, the format 310 of a protocol, e.g., the protocol 114, or the protocol 214, may include various fields, e.g., SoT, DataID, Data 0, Data 1, ECC, and EoT, where SoT is a start of transmission, ECC is an error correction code, and EoT is an end of transmission. ECC may be an 8-bit error correction code, which may allow one-bit errors within the Data 0 or the Data 1 to be corrected and two-bit errors to be detected. The Data 0 and Data 1 may be a fixed size payload, e.g., two bytes, to place data communicated between two devices, e.g., the host 111 and the aggregator 101, or the host 211 and the aggregator 201.

The format 310 may be used in the protocol 214 when the protocol 214 is a MIPI-DSI protocol having 4 channels. For example, the format 310 may be a format for the channel MIPI-DSI-D0. When initially designed for MIPI-DSI-D0, the DataID may contain the source of the data, and the data type information, e.g., the application generating the data in the application layer. In embodiments, the DataID may be extended to include the unique device ID of a device the information is from or to be sent to. For example, the DataID may include the unique device ID of the sensor 131 or the input device 141 in FIG. 1, or the sensor 231 in FIG. 2, when the information to be transferred to the host 111 or the host 211 is from the sensor 131, the input device 141, or the sensor 231. By placing information from the sensor 131 or the input device 141, within the Data 0 or Data 1 packet, while placing the unique device ID of the sensor 131 or the input device 141 in the DataID, the aggregator 101 may transmit the information over the link 112 to the host 111. Hence, information from the sensor 131 or the input device 141 is transmitted over the MIPI-DSI-D0 channel of the link 112. Consequently, the link 112 is shared for the sensor 131 or the input device 141, in addition to communicating between the host 111 and the display device 121.

As shown in FIG. 3(b), in embodiments, the format 320 for a protocol, e.g., the protocol 114, or the protocol 214, may include various fields, e.g., SoT, ECC, checksum, and EoT, where SoT is a start of transmission, ECC is an error correction code, and EoT is an end of transmission. In addition, the format 320 may include a flexible size payload, such as Data 0, Data 1, and more. Therefore a Word Count (Wc), Data Wc-2, Data Wc-1, may be used to convey how many words (bytes) are in the payload so that a receiver can determine the end of the payload. The payload, e.g., Data 0, Data 1, and more, may be used to place information communicated between two devices, e.g., the host 111 and the aggregator 101, or the host 211 and the aggregator 201.

The format 320 may be used in the protocol 214 when the protocol 214 is a MIPI-DSI protocol having 4 channels. For example, the format 320 may be a format for the channel MIPI-DSI-D0. When initially designed for MIPI-DSI-D0, the DataID may contain the source of the data, and the data type information, e.g., the application generating the data in the application layer. In embodiments, the DataID may be extended to include the unique device ID of the device the information is from or to be sent to. For example, the DataID may include the unique device ID of the sensor 131 or the input device 141 in FIG. 1, or the sensor 231 in FIG. 2, when the information to be transferred to the host 111 or the host 211 is from the sensor 131, the input device 141, or the sensor 231. By placing information from the sensor 131 or the input device 141, within the Data 0, Data 1, or other flexible packets, while placing the unique device ID of the sensor 131 or the input device 141 in the DataID, the aggregator 101 may transmit the information over the link 112 to the host 111. Hence, information from the sensor 131 or the input device 141 is transmitted over the MIPI-DSI-D0 channel of the link 112. Consequently, the link 112 is shared for the sensor 131 or the input device 141, in addition to communicating between the host 111 and the display device 121.

In embodiments, the format 310 and the format 320 may be for the same protocol 114, or the same protocol 214, for different information, depending on the content of the information or the size of the information. For example, the format 310 and the format 320 may be an illustration for the different formats in a D0 channel of the MIPI-DSI protocol standard. The aggregator 101 may choose the format 310 with two-byes data for a small amount of data from the sensor 131 to be transferred to the host 111. On the other hand, when a size of data from the sensor 131 may be larger than a predetermined threshold, the aggregator may choose the format 320 with a flexible payload to send data from the sensor 131 to be sent to the host 111.

Figure 4:
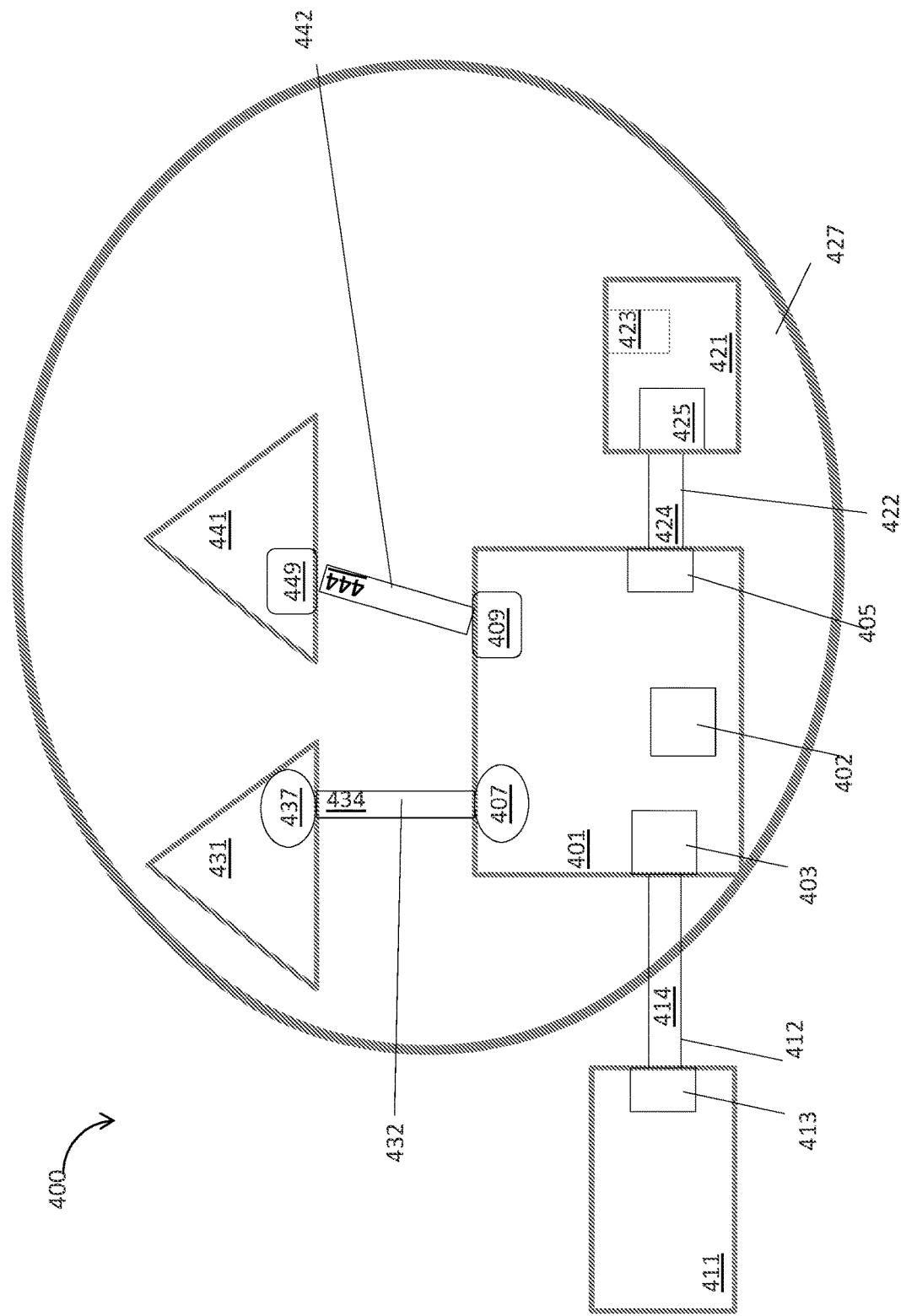
FIG. 4 illustrates another example virtual reality system including multiple devices communicating with a host by way of an aggregator through a shared link between the host and the aggregator, in accordance with various embodiments.

FIG. 4 illustrates another example virtual reality system 400 including multiple devices, e.g., a display device 421, a sensor 431, and an input device 441, communicating with a host, e.g., a host 411, by way of an aggregator, e.g., an aggregator 401, through a shared link, e.g., a link 412 between the host 411 and the aggregator 401, based on a protocol 414, in accordance with various embodiments. The system 400 may be an example of the system 100 shown in FIG. 1. For example, the aggregator 401 may be an example of the aggregator 101, the host 411, the display device 421, the sensor 431, and the input device 441 may be an example of the host 111, the display device 121, the sensor 131, and the input device 441, respectively.

In embodiments, the aggregator 401 may communicate with the host 411 through the link 412 based on the protocol 414, communicate with the display device 421 through a link 422 based on a protocol 424, communicate with the sensor 431 through a link 432 based on a protocol 434, and communicate with the input device 441 through a link 442 based on a protocol 444. The aggregator 401 may convert information from the sensor 431 or the input device 441 in a format based on the protocol 434 or the protocol 444 into a format based on the protocol 414, and further communicate such information to the host 411. Similarly, the aggregator 401 may convert information from the host 411 in a format based on the protocol 414 to a format based on the protocol 434 or the protocol 444 and communicate such information to the sensor 431 or the input device 441. In some embodiments, the protocol 424 may be the same as the protocol 414, and the aggregator 401 may simply pass information in a same format based on the protocol 414 and the protocol 424 between the host 411 and the display device 421.

In embodiments, the aggregator 401 may include an interface 403, an interface 405, an interface 407, and an interface 409, coupled with each other. Similarly, the host 411 may include an interface 413, the display device 421 may include an interface 425, the sensor 431 may include an interface 437, and input device 441 may include an interface 449. In embodiments, the link 412 may be between the interface 403 and the interface 413. The link 422 may be between the interface 405 and the interface 425. The link 432 may be between the interface 407 and the interface 437. The link 442 may be between the interface 409 and the interface 449. In embodiments, the protocol 414 for the link 412, the protocol 424 for the link 422, the protocol 434 for the link 432, or the protocol 444 for the link 442, may be some communication or computing protocols.

In embodiments, the aggregator 401 may include a controller 402 to facilitate the communications among the various devices, e.g., the host 411, the device 42, the device, 431, or the input device 441. The display device 421 may include a display 427 and a controller 423, where the controller 423 may manage the received information from the link 422 to be displayed on the display 427.

The display 427 may include a mechanical support that other devices. For example, the sensor 431, the input device 441, and the aggregator 401 may be mounted on the display 427. Such a display 427 including the sensor 431, the input device 441, and the aggregator 401 mounted together may help a user to have a better control of the user experiences in a VR system, or other systems, e.g., a medical system.

Figure 5:
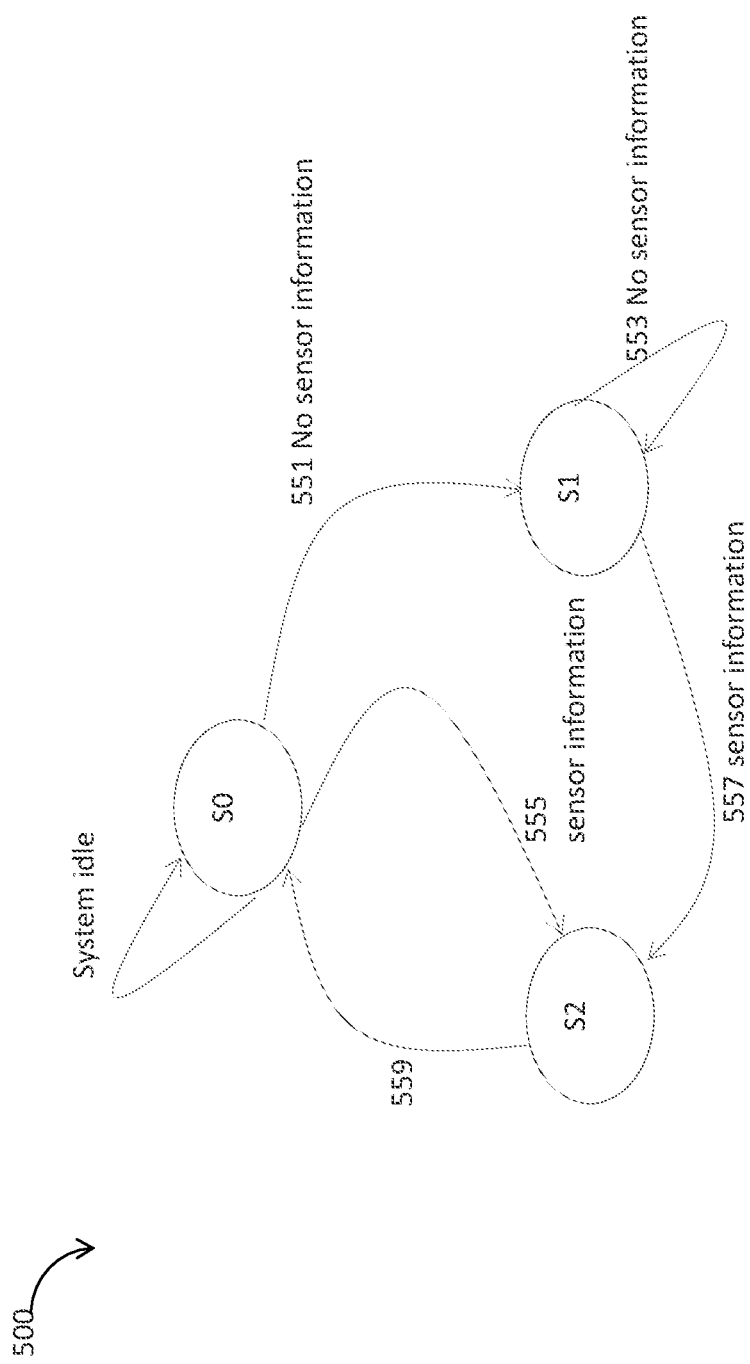
FIG. 5 illustrates an example state diagram of operations performed by an aggregator managing multiple devices communicating with a host by way of the aggregator through a shared link between the host and the aggregator based on a protocol, in accordance with various embodiments.

FIG. 5 illustrates an example state diagram 500 of operations performed by an aggregator managing multiple devices communicating with a host by way of the aggregator through a shared link between the host and the aggregator based on a protocol, in accordance with various embodiments. In embodiments, the state diagram 500 may be managed or facilitated by the controller 102 in the aggregator 101 in FIG. 1, to manage the communication between the host 111, the display device 121, the sensor 131, and the input device 141. The state diagram 500 may be managed by the controller 202 in the aggregator 201 in FIG. 2 as well.

In embodiments, a state S0 may be an initial state. For example, the aggregator 101 may be in an initial state, e.g., the state S0, when the aggregator 101 is idle, and there is no communication conducted among a host, e.g. the host 111, a display device, e.g., display device 121, and sensors, e.g., the sensor 131, or the input device 141. In addition, the controller 102 may register the devices connected to the aggregator 101, for example, to build up a device table and assign a unique device ID for each of the devices, e.g., the host 111, the display device 121, the sensor 131, and the input device 141.

In embodiments, following an interaction 551, the aggregator may move to a state S1 when there is no information from the sensors, e.g., the sensor 131, or the input device 141, while the aggregator 101 may receive information from the host, e.g., the host 111, and pass the received information to the display device, e.g., the display device 121. Following an interaction 553, the aggregator 101 may stay in the state S1 when there is no information from the sensors, e.g., the sensor 131, or the input device 141.

In embodiments, following an interaction 555 when the aggregator is in the state S0, or an interaction 557 when the aggregator is in the state S1, the aggregator may move to a state S2 when there is information received from the sensors, e.g., the sensor 131, or the input device 141. When information is received from the sensors, e.g., the sensor 131, or the input device 141, the controller 102 of the aggregator 101 may convert the information from the sensors in a format based on the protocol 134 or the protocol 144, to a format based on the protocol 114 or the protocol 124 to be transferred to the host, e.g., the host 111, or the display device, e.g., the display device 121.

In embodiments, following an interaction 559, the aggregator may move to the state S0 from the state S2 when the information from the sensor has been processed.

Figure 6:
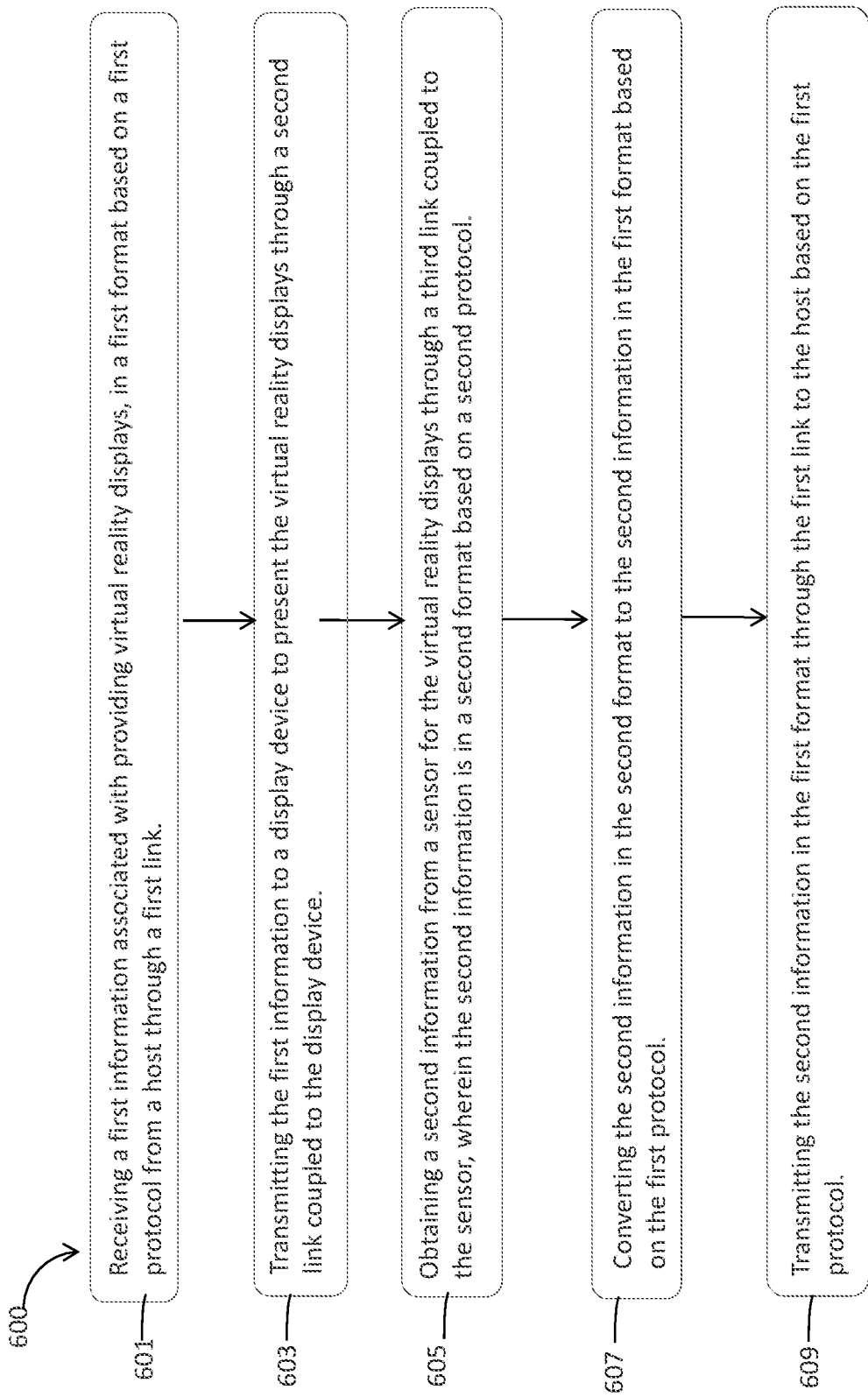
FIG. 6 illustrates an example process for managing multiple devices communicating with a host by way of an aggregator through a shared link between the host and the aggregator in a virtual reality system, in accordance with various embodiments.

FIG. 6 illustrates an example process 600 for managing multiple devices communicating with a host by way of an aggregator through a shared link between the host and the aggregator in a virtual reality system, in accordance with various embodiments. In embodiments, the process 600 may be managed by a virtual reality apparatus, e.g., the controller 102 in the aggregator 101 in FIG. 1, to facilitate the communications among the host 111, the display device 121, the sensor 131, and the input device 141.

The process 600 may start at an interaction 601. During the interaction 601, a first information associated with providing virtual reality displays may be received in a first format based on the first protocol from a host through a first link. For example, at the interaction 601, a first information in a first format based on the first protocol 114 may be received e.g., by the aggregator 101, from the host 111, through a first link, e.g., the link 112.

During an interaction 603, the first information may be transmitted to a display device through a second link coupled to the display device, to present the virtual reality displays. For example, at the interaction 603, the first information may be transmitted, e.g., by the aggregator 101, to a second device, e.g., the display device 121, through a second link, e.g., the link 122, coupled to the display device 121.

During an interaction 605, a second information may be obtained from a sensor for the virtual reality displays through a third link coupled to the sensor, wherein the second information is in a second format based on a second protocol. For example, at the interaction 605, a second information may be obtained, e.g., by the aggregator 101, from the sensor 131, through the link 132 coupled to the sensor 131, wherein the second information is in a second format based on the protocol 134.

During an interaction 607, the second information in the second format may be converted to the second information in the first format based on the first protocol. For example, at the interaction 607, the second information may be converted, e.g., by the aggregator 101 in the second format to the second information in the first format based on the protocol 114.

During an interaction 609, the second information may be transmitted in the first format through the first link to the host based on the first protocol. For example, at the interaction 609, the second information may be transmitted, by the aggregator 101, in the first format through the link 114, to the host 111, based on the protocol 114.

Figure 7:
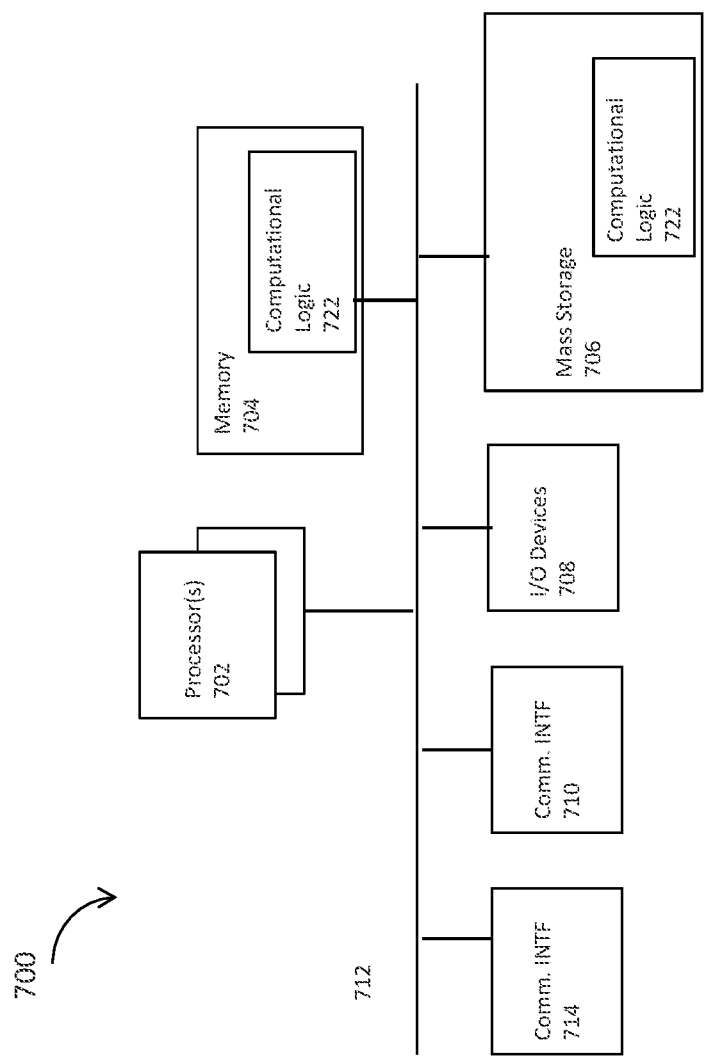
FIG. 7 illustrates an example device suitable for use to practice various aspects of the present disclosure, in accordance with various embodiments.

FIG. 7 illustrates an example communication device 700 that may be suitable as a device to practice selected aspects of the present disclosure. As shown, the device 700 may include one or more processors 702, each having one or more processor cores. The device 700 may be an example of the controller 102 as shown in FIG. 1, or the controller 202 as shown in FIG. 2. Additionally, the device 700 may include a memory 704, which may be any one of a number of known persistent storage medium. Furthermore, the device 700 may include communication interfaces 710 and 714, which may be an example of the interface 103, the interface 105, the interface 107, or the interface 109 as shown in FIG. 1. Communication interfaces 710 and 714 may be any one of a number of known communication interfaces. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 may be employed to store a working copy and a permanent copy of the programming instructions implementing the operations associated with managing multiple devices communicating with a host by way of an aggregator through a shared link between the host and the aggregator based on a protocol, as described in connection with FIGS. 1-6, and/or other functions, collectively referred to as computational logic 722. The various elements may be implemented by assembler instructions supported by processor(s)

702 or high-level languages, such as, for example, C, that can be compiled into such instructions.

The number, capability and/or capacity of these elements 702-714 may vary, depending on the number of other devices the device 700 is configured to support. Otherwise, the constitutions of elements 702-714 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 8:
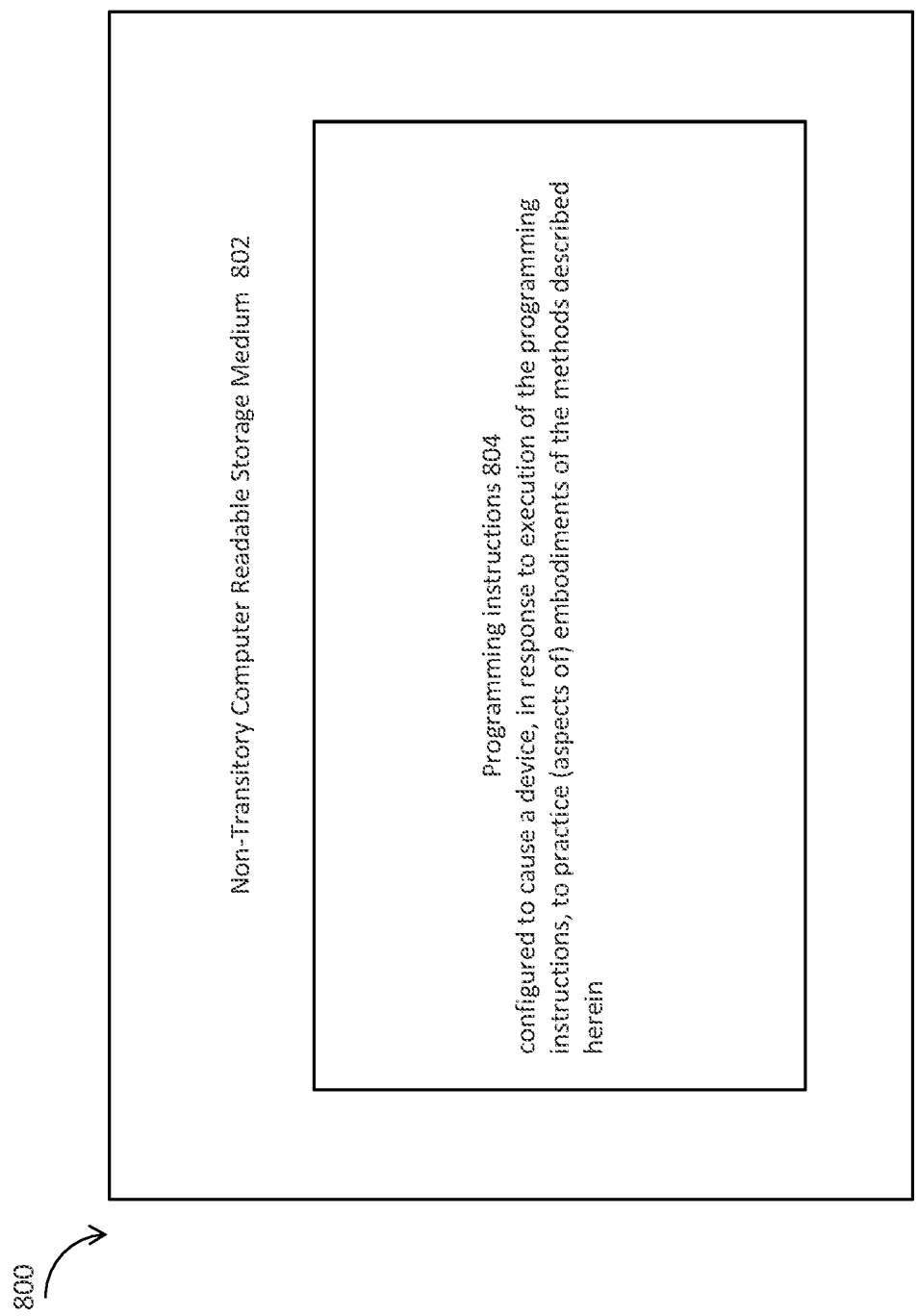
FIG. 8 illustrates a storage medium having instructions for practicing methods described with references to FIGS. 1-7, in accordance with various embodiments.

Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., device 700, in response to execution of the programming instructions, to perform, e.g., various operations associated with the controller 102 shown in FIG. 1 or the controller 202 shown in FIG. 2.

In alternate embodiments, programming instructions 804 may be disposed on multiple computer-readable non-transitory storage media 802 instead. In alternate embodiments, programming instructions 804 may be disposed on computer-readable transitory storage media 802, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for communication in a virtual reality system, comprising: a first interface to communicate with a host through a first link coupled to the first interface based on a first protocol; a second interface coupled to the first interface to communicate with a display device through a second link coupled to the second interface based on the first protocol, wherein the host is to communicate with the display device through the first link based on the first protocol, and the second link based on the first protocol, wherein the first protocol is a display protocol designed for communication with the display device to provide virtual reality displays on the display device; a third interface coupled to the first interface to communicate with a sensor through a third link coupled to the third interface based on a second protocol to provide sensor information for the virtual reality displays; and a controller coupled to the first and third interface to facilitate the sensor in communication with the host through the third link based on the second protocol, and the first link based on the first protocol.

Example 2 may include the apparatus of example 1 and/or some other examples herein, wherein the controller is further coupled to the second interface to facilitate the sensor in communication with the display device through the third link based on the second protocol and the second link based on the first protocol.

Example 3 may include the apparatus of example 1 and/or some other examples herein, further comprising: a fourth interface coupled to the first interface to communicate with an input device through a fourth link coupled to the fourth interface based on a third protocol, wherein the controller is further coupled to the fourth interface to facilitate the input device in communication with the host through the fourth link based on the third protocol, and the first link based on the first protocol.

Example 4 may include the apparatus of any of examples 1-3 and/or some other examples herein, wherein the input device is a selected one of a keyboard, a cursor control device, a pointing stick, a trackball, or a touchpad.

Example 5 may include the apparatus of any of examples 1-3 and/or some other examples herein, wherein the sensor is a selected one of a magnetometer, an accelerometer, a gyroscope, a pressure sensor, a humidity sensor, a proximity sensor, a position sensor, or a temperature sensor.

Example 6 may include the apparatus of any of examples 1-3 and/or some other examples herein, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 7 may include the apparatus of example 6 and/or some other examples herein, wherein the sensor and the apparatus are mounted on the display of the display device.

Example 8 may include the apparatus of any of examples 1-3 and/or some other examples herein, wherein the first protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol.

Example 9 may include the apparatus of any of examples 1-3 and/or some other examples herein, wherein the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

Example 10 may include the apparatus of any of examples 1-3 and/or some other examples herein, wherein information communicated based on the first protocol, which is the display protocol designed for communication with the display device, is in a first format that is designed for display information, information communicated based on the second protocol is in a second format, wherein the controller is to convert information from the sensor through the third link based on the second protocol in the second format to information in the first format of the first protocol, and convert information from the host destined for the sensor through the first link based on the first protocol in the first format to information in the second format of the second protocol.

Example 11 may include the apparatus of any of examples 1-3 and/or some other examples herein, wherein information communicated based on the third protocol is in a third format, wherein the controller is to convert information from the input device through the third link based on the third protocol in the third format to information in the first format of the first protocol, and convert information from the host destined for the input device through the first link based on the first protocol in the first format to information in the third format of the third protocol.

Example 12 may include the apparatus of any of examples 1-3 and/or some other examples herein, wherein the first link based on the first protocol includes a duplex channel, and a plurality of simplex channels, and wherein information from the sensor is transmitted to the host on the duplex channel of the first link.

Example 13 may include a method for operating a virtual reality apparatus, comprising: receiving a first information associated with providing virtual reality displays, in a first format based on a first protocol from a host through a first link; transmitting the first information to a display device to present the virtual reality displays through a second link coupled to the display device; obtaining a second information from a sensor for the virtual reality displays through a third link coupled to the sensor, wherein the second information is in a second format based on a second protocol; converting the second information in the second format to the second information in the first format based on the first protocol; and transmitting the second information in the first format through the first link to the host based on the first protocol.

Example 14 may include the method of example 13 and/or some other examples herein, further comprising: transmitting the second information in the first format through the second link to the display device based on the first protocol.

Example 15 may include the method of example 13 and/or some other examples herein, further comprising: obtaining a third information from an input device through a fourth link coupled to the input device, wherein the third information is in a third format based on a third protocol; converting the third information in the third format to the third information in the first format based on the first protocol; and transmitting the third information in the first format through the first link to the host based on the first protocol.

Example 16 may include the method of any of examples 13-15 and/or some other examples herein, wherein the sensor is a selected one of a magnetometer, an accelerometer, a gyroscope, a pressure sensor, a humidity sensor, a proximity sensor, a position sensor, or a temperature sensor; and the input device is a selected one of a keyboard, a cursor control device, a pointing stick, a trackball, or a touchpad.

Example 17 may include the method of any of examples 13-15 and/or some other examples herein, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 18 may include the method of any of examples 13-15 and/or some other examples herein, wherein the first protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol; and the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

Example 19 may include the method of any of examples 13-15 and/or some other examples herein, wherein the first link includes a duplex channel, and a plurality of simplex channels from the host to the virtual reality apparatus, and wherein the transmitting the second information in the first format includes transmitting the second information in the first format over the duplex channel of the first link.

Example 20 may include the method of example 19 and/or some other examples herein, wherein the second information in the second format is converted to the second information in a fourth format based on the first protocol instead of the first format to be transmitted to the host over the duplex channel of the first link, when a size of the second information is larger than a predetermined threshold.

Example 21 may include a system for virtual reality, comprising: an aggregator; a host coupled with the aggregator, wherein the host is to communicate with the aggregator through a first link based on a first protocol; a display device coupled with the aggregator, wherein the display device is to communicate with the aggregator through a second link based on the first protocol, and wherein the host is to communicate with the display device to provide virtual reality displays through the first link based on the first protocol, and the second link based on the first protocol; and a sensor coupled with the aggregator, wherein the sensor is to communicate with the aggregator through a third link based on a second protocol, and wherein the sensor is to communicate with the host to provide sensor information for the virtual reality displays through the third link based on the second protocol, and the first link based on the first protocol.

Example 22 may include the system for virtual reality of example 21 and/or some other examples herein, further comprising: an input device coupled to the aggregator, wherein the input device is to communicate with the aggregator through a fourth link based on a third protocol, and wherein the input device is to communicate with the host through the fourth link based on the third protocol, and the first link based on the first protocol.

Example 23 may include the system for virtual reality of any of examples 21-22 and/or some other examples herein, wherein the sensor is a selected one of a magnetometer, an accelerometer, a gyroscope, a pressure sensor, a humidity sensor, a proximity sensor, a position sensor, or a temperature sensor; and the input device is a selected one of a keyboard, a cursor control device, a pointing stick, a trackball, or a touchpad.

Example 24 may include the system for virtual reality of any of examples 21-22 and/or some other examples herein, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 25 may include the system for virtual reality of any of examples 21-22 and/or some other examples herein, wherein the first protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol; and the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

Example 26 may include one or more non-transitory computer-readable media comprising instructions that cause a communication apparatus in a virtual reality system, in response to execution of the instructions by the communication apparatus, to: communicate with a host through a first link coupled to a first interface of the communication apparatus based on a first protocol; communicate with a display device through a second link coupled to a second interface of the communication apparatus based on the first protocol, wherein the host is to communicate with the display device through the first link based on the first protocol, and the second link based on the first protocol, and wherein the first protocol is a display protocol designed for communication with the display device to provide virtual reality displays on the display device; communicate with a sensor through a third link coupled to a third interface of the communication apparatus based on a second protocol to provide sensor information for the virtual reality displays; and facilitate by a controller a communication between the sensor and the host through the third link based on the second protocol, and the first link based on the first protocol, wherein the controller is coupled to the first, the second, and the third interfaces.

Example 27 may include the one or more non-transitory computer-readable media of example 26 and/or some other examples herein, wherein the communication apparatus is further caused to: facilitate by the controller a communication between the sensor and the display device through the third link based on the second protocol and the second link based on the first protocol.

Example 28 may include the one or more non-transitory computer-readable media of example 26 and/or some other examples herein, wherein the communication apparatus is further caused to: communicate with an input device through a fourth link coupled to a fourth interface of the communication apparatus based on a third protocol, and facilitate by the controller a communication between the input device and the host through the fourth link based on the third protocol, and the first link based on the first protocol, wherein the controller is coupled to the fourth interface.

Example 29 may include the one or more non-transitory computer-readable media of any of examples 26-28 and/or some other examples herein, wherein the input device is a selected one of a keyboard, a cursor control device, a pointing stick, a trackball, or a touchpad.

Example 30 may include the one or more non-transitory computer-readable media of any of examples 26-28 and/or some other examples herein, wherein the sensor is a selected one of a magnetometer, an accelerometer, a gyroscope, a pressure sensor, a humidity sensor, a proximity sensor, a position sensor, or a temperature sensor.

Example 31 may include the one or more non-transitory computer-readable media of any of examples 26-28 and/or some other examples herein, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 32 may include the one or more non-transitory computer-readable media of any of examples 26-28 and/or some other examples herein, wherein the first protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol.

Example 33 may include the one or more non-transitory computer-readable media of any of examples 26-28 and/or some other examples herein, wherein the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

Example 34 may include the one or more non-transitory computer-readable media of any of examples 26-28 and/or some other examples herein, wherein information communicated based on the first protocol, which is the display protocol designed for communication with the display device, is in a first format that is designed for display information, information communicated based on the second protocol is in a second format, wherein the controller is to convert information from the sensor through the third link based on the second protocol in the second format to information in the first format of the first protocol, and convert information from the host destined for the sensor through the first link based on the first protocol in the first format to information in the second format of the second protocol.

Example 35 may include the one or more non-transitory computer-readable media of any of examples 26-28 and/or some other examples herein, wherein the first link based on the first protocol includes a duplex channel, and a plurality of simplex channels, and wherein information from the sensor is transmitted to the host on the duplex channel of the first link.

Example 36 may include an apparatus for communication in a virtual reality system, comprising: means for communicating with a host through a first link based on a first protocol; means for communicating with a display device through a second link based on the first protocol, wherein the host is to communicate with the display device through the first link based on the first protocol, and the second link based on the first protocol, wherein the first protocol is a display protocol designed for communication with the display device to provide virtual reality displays on the display device; means for communicating with a sensor through a third link based on a second protocol to provide sensor information for the virtual reality displays; and means for facilitating the sensor in communication with the host through the third link based on the second protocol, and the first link based on the first protocol, wherein the means for facilitating are coupled to the means for communicating with the host, the means for communicating with the display device, and the means for communicating with the sensor.

Example 37 may include the apparatus of example 36 and/or some other examples herein, wherein the means for facilitating the sensor in communication with the host further facilitate the sensor in communication with the display device through the third link based on the second protocol and the second link based on the first protocol.

Example 38 may include the apparatus of example 36 and/or some other examples herein, further comprising: means for communicating with an input device through a fourth link based on a third protocol, wherein the means for facilitating are further coupled to the means for communicating with the input device to facilitate the input device in communication with the host through the fourth link based on the third protocol, and the first link based on the first protocol.

Example 39 may include the apparatus of any of examples 36-38 and/or some other examples herein, wherein the input device is a selected one of a keyboard, a cursor control device, a pointing stick, a trackball, or a touchpad.

Example 40 may include the apparatus of any of examples 36-38 and/or some other examples herein, wherein the sensor is a selected one of a magnetometer, an accelerometer, a gyroscope, a pressure sensor, a humidity sensor, a proximity sensor, a position sensor, or a temperature sensor.

Example 41 may include the apparatus of any of examples 36-38 and/or some other examples herein, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 42 may include the apparatus of example 41 and/or some other examples herein, wherein the sensor and the apparatus are mounted on the display of the display device.

Example 43 may include the apparatus of any of examples 36-38 and/or some other examples herein, wherein the first protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol.

Example 44 may include the apparatus of any of examples 36-38 and/or some other examples herein, wherein the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

Example 45 may include the apparatus of any of examples 36-38 and/or some other examples herein, wherein information communicated based on the first protocol, which is the display protocol designed for communication with the display device, is in a first format that is designed for display information, information communicated based on the second protocol is in a second format, wherein the means for facilitating the sensor in communication with the host are to convert information from the sensor through the third link based on the second protocol in the second format to information in the first format of the first protocol, and convert information from the host destined for the sensor through the first link based on the first protocol in the first format to information in the second format of the second protocol.

Example 46 may include the apparatus of any of examples 36-38 and/or some other examples herein, wherein the first link based on the first protocol includes a duplex channel, and a plurality of simplex channels, and wherein information from the sensor is transmitted to the host on the duplex channel of the first link.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for communication in a virtual reality system, comprising:
   a first interface to communicate with a host through a first link coupled to the first interface based on a first protocol;
   a second interface to communicate with a display device through a second link coupled to the second interface based on the first protocol;
   a third interface to communicate with a sensor through a third link coupled to the third interface based on a second protocol; and
   a controller coupled to the first, second, and third interfaces to facilitate the host to communicate with the display device through the first and second links based on the first protocol, and to communicate with the sensor through the first and third links with communications over the third link being based on the second protocol, and communications over the first link being based on the first protocol, bridging differences between the first and second protocols for the host, allowing the host to nominally communicate with both the display device and the sensor over the same first link using the same first protocol.

2. The apparatus of claim 1, wherein the controller is further coupled to the second interface to facilitate the sensor in communication with the display device through the third link based on the second protocol and the second link based on the first protocol.

3. The apparatus of claim 1, further comprising:
   a fourth interface coupled to the first interface to communicate with an input device through a fourth link coupled to the fourth interface based on a third protocol, wherein the controller is further coupled to the fourth interface to facilitate the input device in communication with the host through the fourth link based on the third protocol, and the first link based on the first protocol.

4. The apparatus of claim 3, wherein the input device is a selected one of a keyboard, a cursor control device, a pointing stick, a trackball, or a touchpad.

5. The apparatus of claim 1, wherein the sensor is a selected one of a magnetometer, an accelerometer, a gyroscope, a pressure sensor, a humidity sensor, a proximity sensor, a position sensor, or a temperature sensor.

6. The apparatus of claim 1, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

7. The apparatus of claim 6, wherein the sensor and the apparatus are mounted on the display of the display device.

8. The apparatus of claim 1, wherein the first protocol is mobile industry processor interface display serial interface (MIPI-DSI) protocol.

9. The apparatus of claim 1, wherein the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol.

10. The apparatus of claim 1, wherein information communicated based on the first protocol, which is a display protocol designed for communication with the display device, is in a first format that is designed for display information, information communicated based on the second protocol is in a second format, wherein the controller is to convert information from the sensor through the third link based on the second protocol in the second format to information in the first format of the first protocol, and convert information from the host destined for the sensor through the first link based on the first protocol in the first format to information in the second format of the second protocol.

11. The apparatus of claim 3, wherein information communicated based on the third protocol is in a third format, wherein the controller is to convert information from the input device through the third link based on the third protocol in the third format to information in a first format of the first protocol, and convert information from the host destined for the input device through the first link based on the first protocol in the first format to information in the third format of the third protocol.

12. The apparatus of claim 1, wherein the first link based on the first protocol includes a duplex channel, and a plurality of simplex channels, and wherein information from the sensor is transmitted to the host on the duplex channel of the first link.

13. A method for operating a virtual reality apparatus, comprising:
receiving a first information associated with providing virtual reality displays, in a first format based on a first protocol from a host through a first link;
transmitting the first information to a display device to present the virtual reality displays through a second link coupled to the display device;
obtaining a second information from a sensor for the virtual reality displays through a third link coupled to the sensor, wherein the second information is in a second format based on a second protocol; and
converting the second information in the second format to the second information in the first format based on the first protocol and -transmitting the second information in the first format through the first link to the host based on the first protocol, to bridge differences between the first and second protocols for the host, allowing the host to nominally communicate with both the display device and the sensor over the same first link using the same first protocol.

14. The method of claim 13, further comprising:
transmitting the second information in the first format through the second link to the display device based on the first protocol.

15. The method of claim 13, further comprising:
obtaining a third information from an input device through a fourth link coupled to the input device, wherein the third information is in a third format based on a third protocol;
converting the third information in the third format to the third information in the first format based on the first protocol; and
transmitting the third information in the first format through the first link to the host based on the first protocol.

16. The method of claim 13, wherein the sensor is a selected one of a magnetometer, an accelerometer, a gyroscope, a pressure sensor, a humidity sensor, a proximity sensor, a position sensor, or a temperature sensor; and the input device is a selected one of a keyboard, a cursor control device, a pointing stick, a trackball, or a touchpad.

17. The method of claim 13, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

18. The method of claim 13, wherein the first protocol is a selected one of a mobile industry processor interface display serial interface (MIPI-DSI) protocol, a display port (DP) protocol, a Miracast protocol, or a wireless display (WiDi) protocol; and the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit (I²C) protocol.

19. The method of claim 13, wherein the first link includes a duplex channel, and a plurality of simplex channels from the host to the virtual reality apparatus, and wherein the transmitting the second information in the first format includes transmitting the second information in the first format over the duplex channel of the first link.

20. The method of claim 19, wherein the second information in the second format is converted to the second information in a fourth format based on the first protocol instead of the first format to be transmitted to the host over the duplex channel of the first link, when a size of the second information is larger than a predetermined threshold.

21. A system for virtual reality, comprising:
an aggregator;
a host coupled with the aggregator, wherein the host is to communicate with the aggregator through a first link based on a first protocol;
a display device coupled with the aggregator, wherein the display device is to communicate with the aggregator through a second link based on the first protocol, and wherein the host is to communicate with the display device to provide virtual reality displays through the first and second links based on the first protocol; and
a sensor coupled with the aggregator, wherein the sensor is to communicate with the aggregator through a third link based on a second protocol, and wherein the aggregator facilitates the sensor to nominally communicate with the host to provide sensor information for the virtual reality displays through the third link based on the second protocol, while communications over the first link are based on the first protocol, resulting in the host being able to nominally communicate with both the display device and the sensors over the same first link using the same first protocol.

22. The system for virtual reality of claim 21, further comprising:
an input device coupled to the aggregator, wherein the input device is to communicate with the aggregator through a fourth link based on a third protocol, and wherein the input device is to communicate with the host through the fourth link based on the third protocol, and the first link based on the first protocol.

23. The system for virtual reality of claim 21, wherein the sensor is a selected one of a magnetometer, an accelerometer, a gyroscope, a pressure sensor, a humidity sensor, a proximity sensor, a position sensor, or a temperature sensor; and the input device is a selected one of a keyboard, a cursor control device, a pointing stick, a trackball, or a touchpad.

24. The system for virtual reality of claim 21, wherein the display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

25. The system for virtual reality of claim 21, wherein the first protocol is a selected one of a mobile industry processor interface display serial interface (MIPI-DSI) protocol, a display port (DP) protocol, a Miracast protocol, or a wireless display (WiDi) protocol; and the second protocol is a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit (I$^2$C) protocol.

* * * * *

UNITED STATES PATENT AND TRADEMARK OFFICE
CERTIFICATE OF CORRECTION

PATENT NO. : 10,652,364 B2
APPLICATION NO. : 15/393159
DATED : May 12, 2020
INVENTOR(S) : Sagar C. Pawar et al.

Page 1 of 1

It is certified that error appears in the above-identified patent and that said Letters Patent is hereby corrected as shown below:

In the Claims

Column 25
Line 26, remove the "-" after "and" and before "transmitting".

Signed and Sealed this
Fourteenth Day of July, 2020

Andrei Iancu
*Director of the United States Patent and Trademark Office*